United States Patent
Hausmann

(10) Patent No.: US 6,696,524 B2
(45) Date of Patent: Feb. 24, 2004

(54) LOW TG ETHYLENE-BASED POLYMER, CYCLOOLEFIN POLYMER BLENDS

(75) Inventor: Karlheinz Hausmann, Auvernier (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 42 days.

(21) Appl. No.: 10/071,029

(22) Filed: Feb. 8, 2002

(65) Prior Publication Data

US 2002/0161128 A1 Oct. 31, 2002

Related U.S. Application Data

(60) Provisional application No. 60/269,902, filed on Feb. 20, 2001.

(51) Int. Cl.[7] .................. C08L 33/02; C08L 33/04; C08L 35/02; C08L 45/00; C08F 8/00
(52) U.S. Cl. .................. 525/191; 525/216; 525/221; 525/222
(58) Field of Search ................ 525/191, 216, 525/221, 222

(56) References Cited

U.S. PATENT DOCUMENTS

| 3,264,272 A | | 8/1966 | Rees |
| 4,992,511 A | * | 2/1991 | Yamamoto et al. ........... 525/97 |
| 5,087,677 A | | 2/1992 | Brekner et al. |
| 5,166,250 A | | 11/1992 | Breant |
| 5,272,236 A | | 12/1993 | Lai et al. |
| 5,278,272 A | | 1/1994 | Lai et al. |
| 5,371,158 A | | 12/1994 | Brekner et al. |
| 5,869,586 A | | 2/1999 | Riedel et al. |
| 6,068,936 A | | 5/2000 | Peiffer et al. |
| 6,316,560 B1 | | 11/2001 | Jacobs et al. |

FOREIGN PATENT DOCUMENTS

| DD | 109225 | 10/1974 |
| EP | 407870 | 1/1991 |
| EP | 485893 | 5/1992 |
| EP | 0597119 A1 | 5/1994 |
| EP | 1234854 A1 | 8/2002 |
| WO | WO 9406817 | 3/1994 |
| WO | WO 9827126 | 6/1998 |
| WO | WO 02/066495 A2 | 8/2002 |

OTHER PUBLICATIONS

PCT International Search Report for International application No. PCT/US 02/08149 dated Jan. 20, 2003.

* cited by examiner

Primary Examiner—Nathan M. Nutter

(57) ABSTRACT

Blends comprising an ethylene based polymer having a glass transition temperature lower than or equal to 20° C. and cycloolefin polymer are prepared. The ethylene based polymer preferably comprises at least 60 weight % of ethylene, relative to the weight of the polymer and polar monomers selected from the group of carboxylic acids, alkyl acrylates and vinyl acetates. It is preferably 0.01 to about 99.5% neutralized with metal ions selected from sodium, potassium, zinc, calcium, magnesium, lithium, aluminum, nickel, and chromium. The cycloolefin polymer is preferably an ethylene-norbornene copolymer. The invention also relates to the applications of such blends to improved impact resistant molded articles.

11 Claims, No Drawings

LOW TG ETHYLENE-BASED POLYMER, CYCLOOLEFIN POLYMER BLENDS

This application claims the benefit of U.S. Provisional Application No. 60/269,902, filed Feb. 20, 2001.

FIELD OF INVENTION

This invention relates to blends comprising an ethylene based polymer having a specific glass transition temperature and a cycloolefin polymer, and to their applications in molded articles and films.

BACKGROUND OF THE INVENTION

Cycloolefin polymers have long been used in the preparation of molded articles. But these materials are stiff and brittle. As a consequence, improvement of impact strength, or toughness, of cycloolefin polymers has long been of interest. Resistance to shattering or brittle breaking on impact of molded articles is a desirable feature of any molded article.

Tendency to break on impact in a brittle fashion is a significant limitation on the usefulness of such articles. By "ductile" is meant that sharp cracks in the molded polymer are not initiated, or if initiated do not tend to propagate, from the area of impact. Breaks are characterized more by tearing with a large volume of adjacent material yielding at the edge of the crack or tear rather than a sharp, clean break with little molecular displacement. A polymer having good ductility is one that is resistant to crack propagation caused by impact.

It would therefore be useful to provide a cycloolefin polymer based composition flexible enough to be more resistant to impact when under the form of molded articles or under the form of extruded films.

SUMMARY OF THE INVENTION

Now, it has been surprisingly found that the incorporation of an ethylene based polymer having a specific glass transition temperature into a composition comprising a cycloolefin polymer increases the impact resistance of molded articles made from said composition.

A first aspect of the invention is a blend comprising at least an ethylene based polymer having a glass transition temperature lower than or equal to 20° C. and at least a cycloolefin polymer.

Another aspect of the invention is an article, in particular a molded article, comprising the above blend.

Another aspect of the invention is a film comprising the above blend.

The blend of the invention allows one to obtain improved mechanical properties of molded article.

DETAILED DESCRIPTION OF THE INVENTION

The first essential component of the invention is a cycloolefin polymer. Suitable cycloolefin polymers for the invention have a mean molecular weight Mw (weight average) in the range from 200 to 100,000. They are substantially amorphous, i.e. have a crystallinity of less than 5% by weight. They preferably show a glass transition temperature Tg, which is generally in the range from 0 to 300° C. The polydispersity Mw/Mn of the cycloolefin polymers is preferably from 1 to 5.

Cycloolefin polymers (COPs) are homopolymers built up from only one type of cycloolefins or copolymers built up from cycloolefins and comonomers (COCs), where the comonomer content is at most 20% by weight, based on the weight of the cycloolefin polymer. Cycloolefins are mono or polyunsaturated polycyclic ring systems, such as cycloalkenes, bicycloalkenes, tricycloalkenes or tetracycloalkenes. The ring systems can be monosubstituted or polysubstituted. Preference is given to the cycloolefins which are built up from monoalkylated or unsubstituted cycloolefins. Particularly preferred cycloolefin homopolymers are polynorbornene, polydimethyloctahydronaphthalene, polycyclopentene and poly(5-methyl)norbornene. The cycloolefin polymers can also be branched. Products of this type can have comb or star structures.

If desired, the above-described cycloolefins can also be copolymerized with comonomers. In a preferred embodiment of the invention, these cycloolefin copolymers (COCs) contain up to 20% by weight, preferably about 1–15% by weight, in particular about 1–8% by weight, based on the weight of the COC, of comonomer. Preferred comonomers are olefins having 2 to 6 carbon atoms, in particular ethylene and butylene.

Preferred cycloolefin polymers of the invention are ethylene-norbornene copolymers.

The cycloolefin polymers can be prepared with the aid of transition-metal catalysts. Preparation processes are described, for example, in DD-A-109 225, EP-A-0 407 870, EP-A-0 485 893 and U.S. Pat. Nos. 5,869,586, U.S. 6,068, 936 and WO98/27126 which are incorporated herein by way of reference. Molecular weight regulation during the preparation can advantageously be effected using hydrogen. Suitable molecular weights can also be established through targeted selection of the catalyst and reaction conditions. Details in this respect are given in the above mentioned specifications.

Suitable cycloolefin for the invention are the products sold under the trademark Topas® by Ticona.

The cycloolefin polymer is usually present in the blend of the invention in an amount from 50 weight % to about 99.9%, relative to the weight of the blend.

The second essential component of the composition of the invention is an ethylene based polymer having a glass transition temperature or Tg lower than or equal to 20° C., more preferably lower than or equal to 0° C. Tg is measured through thermomechanical analysis according to ASTM D 3418. This ethylene based polymer is preferably a copolymer or a terpolymer. The ethylene based polymer of the invention preferably comprises ethylene and a comonomer selected from the group of carboxylic acids, alkyl acrylates and alpha-olefins.

Preferred alpha-olefins are selected from the ones having 3–20 carbon atoms, more preferably from the group of 1-pentene, 1-hexene, 4-methyl-1-pentene, 1-octene, 1-decene, 1-dodecene, 1-butene and 1-octene such as described in U.S. Pat. Nos. 5,272,236, 5,278,272 and in WO 94/06817. Most preferably, alpha-olefins have 4–8 carbon atoms. Most preferred alpha-olefins are selected from the group of 1-butene, 1-hexen and 1-octene.

In a preferred embodiment of the invention, the ethylene based polymer is polar, that is to say that it is an ethylene based polymer where part of the hydrogen atoms in the hydrocarbon chain of polyethylene is substituted by at least one atom chosen from oxygen or nitrogen. The ethylene monomer is preferably present in an amount of at least 60 weight %, relative to the weight of the polymer.

In a preferred embodiment of the invention, the ethylene based polymer is of ethylene, α,β-ethylenically unsaturated $C_3$–$C_8$ carboxylic acid, and optionally one or more softening comonomers copolymerizable with ethylene. The α,β-ethylenically unsaturated $C_3$–$C_8$ carboxylic acid is preferably present in an amount of 5–15 weight %, relative to the weight of the polymer. The softening monomer is preferably present in an amount of less than 25 weight %, relative to the weight of the polymer. Acrylic and methacrylic acids are preferred acid comonomers. The softening comonomer can be an alkyl acrylate selected from the group consisting of methyl acrylate, n-propyl-, iso-butyl-, n-butyl-, n-octyl-, 2-ethylhexyl-. and 2-methoxyethyl-acrylates. The preferred alkyl acrylates are iso-butyl-, n-butyl-, 2-ethylhexyl-, and 2-methoxyethyl-acrylates. The softening comonomer can also be an alkyl vinyl ether selected from the -group consisting of n-butyl-, n-hexyl-, 2-ethylhexyl-, and 2-methoxyethyl-vinyl ether. The preferred alkyl vinyl ethers are n-butyl vinyl ether and n-hexyl vinyl ether.

The polymer is optionally about 0.01 to 99.5% neutralized with metal ions selected from groups Ia, Ib, IIa, IIIa, IVa, VIb, and VIII of the Periodic Table of Elements such as sodium, potassium, zinc, calcium, magnesium, lithium, aluminum, nickel, and chromium. Such neutralized ethylene acid copolymers are known in the art as 'ionomers'. Typically, neutralization will be from 10–70%. Preferably the copolymer has from about 35 to about 70% of the carboxylic acid groups ionized by neutralization with metal ions selected from the group consisting of sodium, potassium, zinc, calcium, and magnesium. Ionomers and their methods of manufacture are described in U.S. Pat. No. 3,264,272.

Suitable polymers for use in the present invention are the ionomers commercially available under the trademark Surlyn® from E. I. du Pont de Nemours and Company and the ethylene acid copolymers available under the trademark Nucrel® from E. I. du Pont de Nemours and Company.

In another preferred embodiment of the invention, the ethylene based polymer is of ethylene, alkyl (meth)acrylate and optionally one vinylalkylsilane termonomer. The alkyl (meth)acrylate monomer is preferably present in an amount of 5–40 weight %, relative to the weight of the polymer. The vinylalkylsilane termonomer is preferably present in an amount of less than 3 weight %, relative to the weight of the polymer. The alkyl group of the alkyl (meth)acrylate monomer is preferably methyl but can be a higher alkyl group up to octyl. The preferred vinylalkylsilane termonomers are vinylmethylsilane and vinylethylsilane. Suitable polymers for use in the present invention are the products commercially available under the trademark Elvaloy® AC from E. I. du Pont de Nemours. These polymers can be prepared by the various methods known in the art such as high pressure free radical polymerization.

The ethylene based polymer is usually present in the blend of the invention in an amount from about 0.1 weight % to 50 weight %, relative to the weight of the blend.

The blends of the invention may comprise the usual additives including plasticizers, stabilizers, antioxidants, ultraviolet ray-absorbers, hydrolytic stabilizers, anti-static agents, dyes or pigments, fillers, fire-retardants, lubricants, reinforcing agents such as glass fiber and flakes, processing aids, for example release agents, and/or mixtures thereof.

The blend of the invention can be prepared by any extrusion process, for instance in the following manner: a blend is prepared by simply mixing the dry components, as a salt and pepper blend. This blend is then compounded in an extruder. The exiting compound is granulated.

The molded article is prepared as follows: the blend obtained from the compounding step in the extruder is fed into a molding machine. Parts in different shapes are injected under high pressure from the molten polymer.

The film of the invention can be prepared by extrusion as follows: the granulates obtained as hereinabove are melted in a suitable extruder and converted into a film with at least one individual layer using a converting technique. Suitable converting techniques are for instance blown film extrusion, cast sheet extrusion, extrusion coating.

The invention will be further described in the following Examples.

EXAMPLES

Description of Ingredients:

Materials used in the Examples set forth below are as follows, identified by the respective trademarks and trade designations:

TOPAS® 8007: copolymer of ethylene and norbornene, commercially sold by TICONA

TOPAS® 6013: copolymer of ethylene and norbornene, commercially sold by TICONA

Ionomer 1: copolymer with ethylene, 10% methacrylic acid and 10% i-butylacrylate, MFI (melt flow index) of 1, 36% neutralized with Na, commercially available from E. I. du Pont de Nemours and Company.

Ionomer 2: copolymer with ethylene, 10% methacrylic acid and 10% i-butylacrylate, MFI of 1, 73% neutralized with Zn, commercially available from E. I. du Pont de Nemours and Company.

Elvaloy® AC 2116: copolymer of ethylene and 16% ethylacrylate, MFI of 1, commercially available from E. I. du Pont de Nemours and Company.

The Melt Flow Index (MFI) of the above compounds is measured according to ASTM D 1238 @ 190° C./2.16 kg The following compositions were prepared. All amounts are given in parts by weight relative to the total weight of the composition.

| Composition | 1 | 2 | 3 | 4 |
|---|---|---|---|---|
| Topas ® 8007 | 100 | 80 | 80 | |
| Topas ® 6013 | | | | 80 |
| Ionomer 1 | | 20 | | |
| Ionomer 2 | | | 20 | |
| Elvaloy ® AC 2116 | | | | 20 |

The compositions are compounded in a 24 mm PRISM twin screw extruder using a high shear screw. All ingredients were prepared as a salt and pepper blend and granulated after exiting the extruder.

The compounding temperature conditions were as such:

| Feed | Zone 1 | Zone 2 | Zone 3 | Die | Melt |
|---|---|---|---|---|---|
| 200 | 225 | 230 | 230 | 230 | 230 |

Gardner Impact Test:

The granulates obtained above are melted in Brabender 24 mm single screw extruder where 1 mm thick sheets are extruded. The melting temperature of the Brabender single screw extruder was as follows:

| Feed | Zone 1 | Zone 2 | Zone 3 | Die | Melt |
|---|---|---|---|---|---|
| 180 | 195 | 225 | 240 | 240 | 240 |

These sheets were subsequently tested for their impact resistance by a GARDNER falling weight test according to ISO 6603/1 with 250 g weight at room temperature.

The results are collected in the following table:

| Composition | 1 | 2 | 3 | 4 |
|---|---|---|---|---|
| Gardner Impact in J | 153 | 5248 | 3518 | 1900 |

The Gardner Impact corresponds to the quantity of energy which is necessary to break the sheet. In consequence, the greater the value of the Gardner impact, the more resistant to impact the sheet. It is clear from these results that the introduction of 20% of an ethylene based polymer according to the invention to a composition of cycloolefin polymer increases the impact resistance of the sheet made of said composition.

Notched Izod Test:

The granulates obtained above were melted in a RAY RAM injection molding press for test samples at 240° C./8.5 bars into Izod bars of the dimension 80 mm×10 mm, which were subsequently mechanically notched in order to produce samples according to ISO 180. These samples were tested at room temperature (about 23° C.) on an instrumented impact tester of the type CEAST 6548 with a pendulum J2.

The results are collected in the following table:

| Composition | 1 | 2 | 3 | 4 |
|---|---|---|---|---|
| Notched Izod value In kJ/m$^2$ | 2.1 | 2.2 | 3.3 | 4.7 |

The greater the Notched Izod value, the more resistant to impact the molded bar.

It is clear from these results that addition of the ethylene based polymer of the invention to cycloolefin polymers significantly increases the impact resistance of molded articles made from cycloolefin polymers based composition.

What is claimed is:

1. A blend consisting essentially of at least an ethylene based polymer having a glass transition temperature lower than or equal to 20° C. and at least a cycloolefin polymer.

2. The blend of claim 1, wherein the cycloolefin polymer is built up from cycloolefins and comonomers, where the comonomer content is at most 20% by weight, based on the weight of the cycloolefin polymer.

3. The blend of claim 2, wherein the cycloolefin polymer is an ethylene-norbornene copolymer.

4. The blend of claim 1, wherein the cycloolefin polymer is present in an amount from 50 weight % to about 99.9 weight %, relative to the weight of the blend.

5. The blend of claim 1, wherein the ethylene based polymer has a glass transition temperature lower than or equal to 0° C.

6. The blend of claim 1, wherein the ethylene based polymer comprises at least 60 weight % of ethylene, relative to the weight of the polymer and polar monomers selected from the group of carboxylic acids and alkyl acrylates.

7. The blend of claim 1, wherein the ethylene based polymer is 0.01 to about 99.5% neutralized with metal ions selected from sodium, potassium, zinc, calcium, magnesium, lithium, aluminum, nickel, and chromium.

8. The blend of claim 1, wherein the ethylene based polymer is present in an amount from about 0.1 weight % to 50%, relative to the weight of the blend.

9. A molded article comprising the blend of claim 8.

10. A film comprising the blend of claim 8.

11. A method for improving the impact resistance of a molded article made of a cycloolefin polymer comprising the step of introducing therein from about 0.1 to 50% by weight, relative of the weight of the article, of an ethylene based polymer having a glass transition temperature lower than or equal to 20° C.

* * * * *